Feb. 15, 1955
M. H. MESNER
2,702,382
RADIO PULSE-ECHO LOCATOR SYSTEM
FOR DETECTING MOVING OBJECTS
Filed April 10, 1944
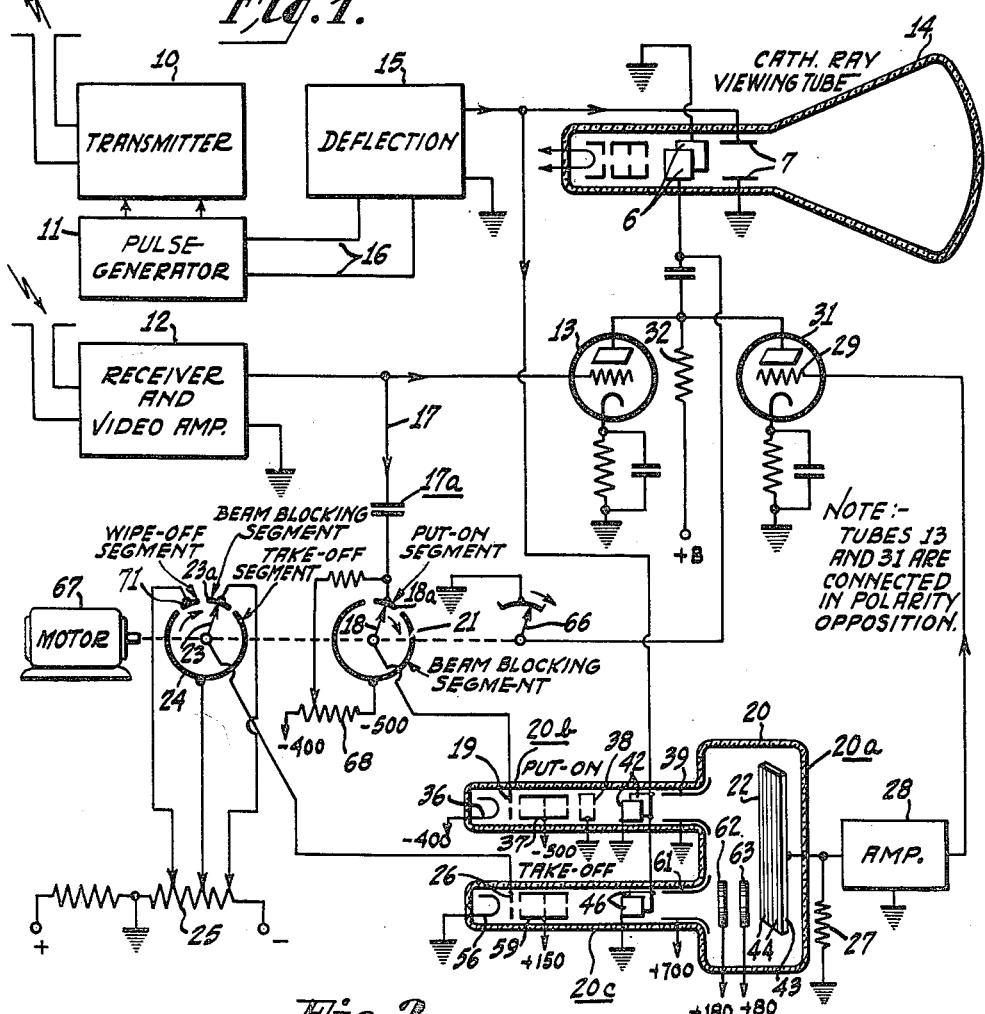
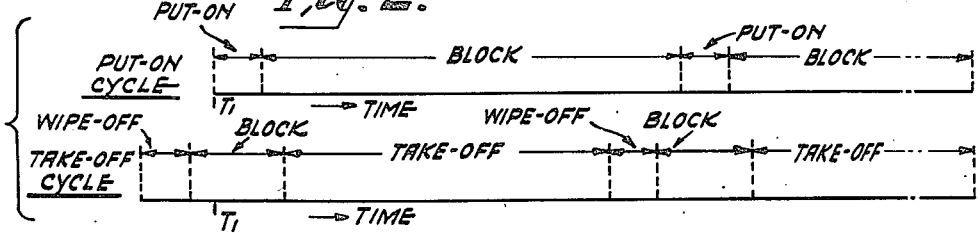
INVENTOR.
MAX H. MESNER
BY
ATTORNEY

United States Patent Office 2,702,382
Patented Feb. 15, 1955

2,702,382

RADIO PULSE-ECHO LOCATOR SYSTEM FOR DETECTING MOVING OBJECTS

Max H. Mesner, Princeton, N. J., assignor to Radio Corporation of America, a corporation of Delaware Application April 10, 1944, Serial No. 530,387

8 Claims. (Cl. 343—7.7)

My invention relates to pulse-echo locator and distance determining systems and particularly to systems of this type designed for detecting and locating moving objects or targets such as approaching aircraft.

One of the difficulties in locating an approaching aircraft, for example, is that many echo pulses are received as a result of reflection from stationary objects such as buildings, hills, etc., which tend to mask or obscure the pulses reflected from the aircraft. This is particularly true if the aircraft is flying at a low altitude. Because of this masking effect of undesired reflected pulses, the effective range of the pulse-echo system is less than it would be otherwise.

An object of the present invention is to provide for a pulse-echo system an improved method of and means for reducing the masking or obscuring effect of pulses reflected from stationary objects.

A further object of the invention is to provide an improved radio locator system.

A still further object of the invention is to provide improved radio locator receiving means for locating moving targets.

In one preferred embodiment of the invention the system may include a pulse transmitter and a pulse receiver of the type commonly employed in pulse-echo locator systems. In accordance with the present invention, the receiving means also comprises a storage tube or the like by means of which received pulses may be stored and then taken off at a later interval. The storage tube includes a storage screen comprising a plurality of capacity elements. Switching means are provided by means of which received signals are applied to the "put-on" section of the storage tube for a short interval. The resulting stored signals are then taken off the storage tube during a comparatively long interval and applied, together with signal taken directly from the receiver, to a signal cancellation circuit. As will be explained hereinafter, the signals that have been reflected from stationary objects are canceled or balanced out in the cancellation circuit so that the only signals that appear in its output circuit are those from moving targets that have changed their location substantially between successive "put-on" intervals.

The invention will be better understood from the following description taken in connection with the accompanying drawing in which:

Figure 1 is a block and circuit diagram of one embodiment of the invention, and

Figure 2 is a group of graphs that are referred to in explaining the operation of the system of Fig. 1.

Fig. 1 shows a pulse-echo system comprising a radio pulse transmitter 10 which is modulated by the pulses from a pulse generator 11 whereby pulses of radio energy are radiated toward reflecting objects or targets to be located. After reflection from a target, the pulses are received and demodulated by a receiver 12 and supplied through an amplifier tube 13 to the vertical deflecting plates 6 of a conventional cathode-ray tube indicator 14. The amplifier 13 forms part of the signal cancellation circuit. Time axis deflection for the electron beam of the indicator tube 14 is provided by a sawtooth wave generator 15 which is connected to the horizontal deflecting plates 7. The generator 15 is synchronized by pulses supplied over a line 16 from the pulse generator 11. The system of Fig. 1 described thus far is conventional.

According to a preferred embodiment of the present invention the output of the receiver 12 is also supplied over a conductor 17 and through a blocking capacitor 17a, a switch segment 18a and a switch arm 18 to the "put-on" beam control electrode or grid 19 of a cathode-ray storage tube 20. During the interval that the switch arm 18 is in contact with the switch segment 18a, the received signal modulates the "put-on" beam and the signal is stored on a storage screen 22. Next, signal is taken off the storage screen 22 during a comparatively long interval as follows: At the end of the "put-on" interval, a switch arm 23 comes into contact with a switch segment 24, thus applying negative bias from a bias source 25 to the control electrode 26 in the "take-off" section of the storage tube 20. This bias is adjusted to make the take-off beam intensity such that the take-off beam may be deflected repeatedly across the screen 22, removing only a small part of the stored signal each time. The signal thus removed appears across an output resistor 27, is amplified by an amplifier 28, and is then applied to the control grid 29 of an amplifier tube 31.

Amplifier tubes 31 and 13 together comprise the signal cancellation circuit. They have a common anode resistor 32 whereby their outputs add. Also, their outputs are opposite in polarity so that if the outputs are identical, they cancel or balance out and no signal is applied to the indicator tube 14. This will be the condition with respect to signals reflected from stationary objects but not with respect to moving objects.

Before describing the circuit and circuit operation more in detail, the design of the storage tube 20 will be described. This tube is described and claimed in appplication Serial No. 492,658, filed June 26, 1943, now U. S. Patent 2,454,652 issued November 23, 1948, as the joint invention of Harley Iams, Albert Rose and Gardner L. Krieger, and entitled Cathode Ray Storage Tube. In this particular example, the tube 20 comprises a highly evacuated envelope having a bulb portion 20a, in which the storage screen 22 is mounted, and having two neck portions 20b and 20c in which are mounted a high velocity beam "put-on" gun and a low velocity "take-off" gun, respectively.

The high velocity and low velocity electron guns may be of well known types such as those employed in the high velocity beam and low velocity beam television pick-up tubes known as the Iconoscope and the Orthicon, respectively. In the example illustrated, the high velocity gun comprises a cathode 36, the control grid 19, a first anode 37 and a second anode 38. A collector electrode 39 is provided to collect secondary electrons from the storage screen 22. Vertical deflection of the "put-on" beam may be produced by means of a pair of deflecting plates 42. Operating voltages that may be applied to the various tube electrodes are indicated on the drawing merely by way of example.

The storage screen 22 may be constructed in various ways. One of the preferred constructions comprises a supporting sheet of mica 43 about 0.001 inch thick which has conducting strips or lines 44 extending horizontally across its front surface. The strips 44 may be formed, for example, by sputtering a conducting coating of platinum upon each side of the mica sheet and then scratching about 100 lines to the inch on the front or scanned side with a ruling machine to separate the metal into conducting lines. The conducting coating on the back side of the mica sheet 43 is used, in the example illustrated, as the signal plate for taking off the signal through the output resistor 27.

During the processing of the tube, the screen 22 preferably has silver evaporated thereon to make the secondary emission uniform over the whole line surface. The amount of silver introduced is too small to make the space between the lines 44 conducting. A small amount of caesium may also be introduced into the tube during the processing to make sure that the ratio of secondary electrons to primary electrons is greater than unity. Since it is preferred that the screen 22 shall not be photoelectric, no oxidizing step preceding the introduction of caesium is required, as would be the case in processing a mosaic screen for an Iconoscope.

The screen 22, when mounted in the tube, preferably is curved to conform to the surface of a cylinder having an axis that passes through or near the centers of deflection of the two electron beams whereby the point of smallest beam diameter is always at the screen surface as the beam is deflected and whereby the beams during deflection are substantially at right angles to the screen surface where the beam strikes. The latter feature is important in the operation with a low velocity beam.

In operation, the signal applied to the control electrode 19 modulates the intensity of the high velocity beam as it is deflected vertically across the conducting strips. The number of secondary electrons liberated from the strips exceeds the number of beam electrons and, since substantially all of the secondary electrons are drawn over to the collector electrode 39, they are not redistributed over the screen 22. Hence, the bombarded strips 44 are given a more positive potential.

At the other end of the screen 22 the conducting strips 44 are scanned during the "take-off" interval by deflecting the low velocity beam vertically across the strips 44 by means of deflecting plates 46 or by means of deflecting coils, if preferred. When the strips 44 are scanned by the low velocity beam, the electrons of the beam strike the conducting strips 44 with a velocity so low that the ratio of secondary electrons to primary or beam electrons is less than unity. Preferably the tube is operated with the low velocity beam of low current density so that the beam removes very little of the stored signal as it scans once across the screen. Means described hereinafter is provided to insure complete "wipe-off" at the end of the plurality of scannings.

In the example illustrated, the low velocity beam electron gun comprises the cathode 56, the control electrode 26, a first anode 59 and a second anode 61. Two frame-like or ring electrodes 62 and 63 are positioned between the second anode 61 and the screen 22 for slowing down the electrons after they leave the region of the second anode 61.

Referring again to the circuit of Fig. 1, the switch arms 18 and 23 and a switch arm 66 are driven in a fixed time relation by a motor 67. The time relation of the several switch positions will be apparent from Fig. 1 and also from the graphs in Fig. 2. During the "put-on" interval, the "put-on" beam is biased to a low intensity value by means of a biasing source such as a voltage divider 68. Thus, the charge on the capacity or mosaic elements of the screen 22 at a particular point on the screen is increased from zero or nearly zero value by any reflected signal received during the "put-on" period. Meanwhile, the switch arm 23 is in contact with a switch segment 23a to hold the take-off beam biased to cut-off. At the end of the "put-on" period, the "put-on" beam preferably is biased to cut-off by a connection through the switch segment 21.

Also at the end of the "put-on" period, the switch arm 23 moves into contact with the switch segment 24 whereby the "take-off" beam is unblocked and begins to take signal off the storage screen 22. The "take-off" interval is of comparatively long duration as will be apparent from the length of the segment 24. At the end of the "take-off" period, the switch 23 comes into contact with a switch segment 71 whereby a lower bias voltage is applied to the control grid 26. Thus, the take-off beam intensity is increased sufficiently to wipe-off any signal that may be left on the storage screen 22 whereby the cycle of signal "put-on" and signal "take-off" may be repeated.

The switch arm 66 grounds the output circuits of amplifier tubes 13 and 31 during the signal put-on and signal wipe-off periods so that the only signal indications on the tube 14 are those that are produced during the signal take-off period when the stored signal output of tube 31 is being balanced against the directly received signal output of tube 13.

The sawtooth generator 15 may be utilized for deflecting both beams of the storage tube 20 and the cathode beam of the indicator tube 14 in synchronism. The deflection rate for these beams is the same as the pulse rate of the transmitted pulses.

From the foregoing it will be seen that radio pulses reflected from stationary objects will be canceled out in the common plate circuit of amplifier tubes 13 and 31 since the signals that are being taken off the storage screen 22 and applied to the tube 31 arrived at the receiver (following the instant of pulse transmission) with the same time interval of delay as in the case of the signals being applied to the tube 13 directly from the receiver 12. Thus, echo pulses from stationary objects appear simultaneously at the anodes of tubes 13 and 31 and cancel each other since they also are of opposite polarity and of equal amplitude.

As to a moving target such as an airplane, however, the interval between "put-on" periods is long enough so that the pulses reflected from it arrive with different delays during successive "put-on" periods so that they do not cancel each other. The result is that the moving target signal is visible on the screen of the cathode ray tube 14 even though there may be enough reflected signals from fixed objects to mask it in the absence of cancellation of fixed target signals.

It will be understood that the duration of a cycle of operation, as well as the width or duration of a pulse, will depend upon the use for which the apparatus is designed and upon various other factors. As one example of a suitable design for a pulse-echo system transmitting pulses of about one microsecond duration, the switch arms 18, 23 and 66 may be driven at the rate of one-half rotation per second. In this example, the cycle of operation of two seconds has been made long enough to permit an airplane to travel about one-tenth of a mile, assuming its speed is about 200 miles per hour. Therefore, in the example assumed, from the start of one rotation of the switch arms 18, 23 and 66 to the end of the rotation, the airplane will have traveled far enough so that the pulse reflected therefrom has shifted its position or time of reception by about one pulse width. If the design requirements permit, more shift than this in the pulse position during an operation cycle may be desirable.

In the case of a slower moving target, such as a tank, the pulse width might be one-tenth microsecond with the rate of rotation of the switch arms 18, 23 and 66 being one rotation every two seconds.

I claim as my invention:

1. In a pulse-echo receiver, means for receiving pulses that have been reflected from reflecting objects, a signal channel and a signal storage device in said channel, means for supplying said reflected pulses to said channel and for storing said pulses on said device, a second signal channel and means for supplying thereto pulses reflected from said objects after said storage of pulses, means for taking pulses off said storage device while said last-mentioned pulses are being supplied to said second channel, and circuit means for balancing said last-mentioned received pulses against said pulses taken off said storage device whereby the pulses reflected from stationary objects are substantially balanced out and whereby pulses from moving objects are not balanced out.

2. In a pulse-echo receiver, a cathode-ray storage tube of the type comprising a storage screen having capacitive elements, means for receiving pulses after they have been reflected from reflecting objects, means for storing received pulses on said storage screen during a comparatively short time interval, means for repeatedly taking signal off said screen during a comparatively long time interval, and means for mixing the signal that is being taken off said screen in polarity opposition with signal that is being obtained directly with the receiver to obtain substantially an indication of moving objects only.

3. In a pulse-echo system, the method of reception which comprises receiving pulses that have been reflected from both stationary and moving reflecting objects, storing said pulses as electric charges, receiving pulses reflected from said objects after said storage of pulses and simultaneously converting said stored electric charges to electric pulses, and balancing the later received pulses against said converted pulses whereby the pulses reflected from the stationary objects are substantially balanced out.

4. In a receiver for a pulse-echo radio locator system of the type wherein radio pulses are transmitted toward reflecting objects to be located, a cathode-ray storage tube of the type comprising a storage screen having capacitive elements, said tube having an electron gun for producing a put-on beam and an electron gun for producing a take-off beam, means for deflecting said beams in a fixed time relation with the radio pulse transmission, means for receiving electrical pulses after they have been reflected from reflecting objects, means for intensity modulating the put-on beam by said received pulses to store a plurality of received pulses on said storage screen during a put-on time interval, means for discontinuing said modulation of the put-on beam at the end of said put-on interval, means for scanning said storage screen by said take-off beam and taking stored signal off said screen during an interval following said put-on interval, and means for balancing said stored signal after it is taken off said screen against signal obtained directly from the receiver to cancel out signals reflected from stationary objects.

5. In a receiver for a pulse-echo radio locator system of the type wherein radio pulses are transmitted for locating moving objects, a cathode-ray storage tube of the type comprising a storage screen having capacitive elements, said tube having an electron gun for producing a put-on beam and an electron gun for producing a take-off beam, means for deflecting said beams synchronously with the radio pulse transmission, means for receiving electrical pulses after they have been reflected from reflecting objects, means for intensity modulating the put-on beam by said received pulses to store a plurality of received pulses on said storage screen during a put-on time interval, means for blocking said take-off beam during said put-on interval, means for biasing the put-on beam gun substantially to beam current cut-off at the end of said put-on interval, means for unblocking said take-off beam and taking stored signal off said screen at the end of said put-on interval, and means for balancing said stored signal after it is taken off said screen against signal obtained directly from the receiver to cancel out signals reflected from stationary objects.

6. In a pulse-echo system, the method of reception which comprises receiving pulses that have been reflected from both stationary and moving reflecting objects, storing said pulses as electric charges during a certain period, next successively and repeatedly converting said stored electric charges to delayed electric pulses, and mixing in polarity opposition said delayed converted pulses with undelayed received pulses whereby the pulses reflected from stationary objects are substantially balanced out.

7. In a pulse-echo receiver, means for continuously receiving pulses that have been reflected from reflecting objects, two signal transmitting channels to which said received pulses are applied, a signal storage device in one of said channels, means for storing said received pulses on said storage device during a storage time interval, means for taking delayed pulses off said storage device, a pulse indicator, means for combining the outputs of said two channels in polarity opposition, and means for applying said combined outputs to said pulse indicator.

8. In a pulse-echo receiver, means for continuously receiving pulses that have been reflected from reflecting objects, two signal transmitting channels to which said received pulses are applied, a signal storage device in one of said channels, means for storing said received pulses on said storage device during a storage time interval, means for taking delayed pulses off said storage device, a cathode-ray tube for indicating visually the reception of reflected pulses, means for combining the outputs of said two channels in polarity opposition, and means for applying said combined outputs to said cathode-ray tube whereby the indications of pulses reflected from moving objects are improved in visibility.

No references cited.